(12) United States Patent
Liu et al.

(10) Patent No.: US 10,832,034 B2
(45) Date of Patent: Nov. 10, 2020

(54) FACIAL IMAGE GENERATING METHOD, FACIAL IMAGE GENERATING APPARATUS, AND FACIAL IMAGE GENERATING DEVICE

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Yu Liu, Beijing (CN); Erjin Zhou, Beijing (CN)

(73) Assignees: BEIJING KUANGSHI TECHNOLOGY CO., LTD., Beijing (CN); MEGVII (BEIJING) TECHNOLOGY CO., LTD, Beijing (CN)

( * ) Notice: Subject to any disclaimer, the term of this patent is extended or adjusted under 35 U.S.C. 154(b) by 307 days.

(21) Appl. No.: 15/814,101

(22) Filed: Nov. 15, 2017

(65) Prior Publication Data

US 2018/0137343 A1    May 17, 2018

(30) Foreign Application Priority Data

Nov. 16, 2016   (CN) .......................... 2016 1 1008893

(51) Int. Cl.
G06K 9/62   (2006.01)
G06K 9/00   (2006.01)
(Continued)

(52) U.S. Cl.
CPC ..... *G06K 9/00275* (2013.01); *G06K 9/00241* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS 7,227,976 B1   6/2007  Jung et al.
9,430,697 B1 * 8/2016  Iliadis ..................... G06F 16/50
(Continued)

FOREIGN PATENT DOCUMENTS

CN         102034097      4/2011
CN           1807804      5/2011
(Continued)

OTHER PUBLICATIONS

Chen, et al., An End-to-End System for Unconstrained Face Verification with Deep Convolutional Neural Networks, 2015, 2015 IEEE International Conference on Computer Vision Workshop (ICCVW), pp. 118-126.*
(Continued)

*Primary Examiner* — Guillermo M Rivera-Martinez
(74) *Attorney, Agent, or Firm* — Hamre, Schumann, Mueller & Larson, P.C.

(57) ABSTRACT

A facial image generating method, a facial image generating apparatus, and a facial image generating device are proposed. The method comprises: linking an M-dimensional facial feature vector with an N-dimensional demanded feature vector to generate a synthesized feature vector; and generating a synthesized facial image by use of a deep convolutional network for facial image generation and based on the synthesized feature vector. The method further comprises: generating a demand satisfaction score based on the synthesized facial image and the demanded feature vector by use of a deep convolutional network for demand determination; and updating parameters of the deep convolutional network for facial image generation and the deep convolutional network for demand determination based on the
(Continued)

US 10,832,034 B2

Page 2 demand satisfaction score. A facial image is generated based on a facial feature vector and a demanded feature vector, a facial image with a specific feature can be generated without using the three-dimensional model.

16 Claims, 11 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 2006/0061598 A1 | 3/2006 | Mino et al. | |
| 2006/0062435 A1 | 3/2006 | Yonaha | |
| 2009/0052747 A1 | 2/2009 | Kamiyama et al. | |
| 2009/0225099 A1 | 9/2009 | Yuasa | |
| 2009/0290800 A1* | 11/2009 | Lo | G06K 9/6203 382/197 |
| 2010/0088259 A1* | 4/2010 | Valpola | G06N 3/08 706/14 |
| 2011/0081089 A1* | 4/2011 | Mori | G06K 9/00281 382/218 |
| 2011/0304607 A1 | 12/2011 | Ito | |
| 2012/0045095 A1* | 2/2012 | Tate | G06T 5/003 382/103 |
| 2012/0120273 A1 | 5/2012 | Amagai et al. | |
| 2013/0328918 A1 | 12/2013 | Okamura et al. | |
| 2014/0229476 A1* | 8/2014 | Fouad | G06F 16/355 707/729 |
| 2014/0247374 A1 | 9/2014 | Murakami et al. | |
| 2014/0328547 A1 | 11/2014 | Whitehill et al. | |
| 2015/0254501 A1 | 9/2015 | Yamanashi et al. | |
| 2015/0309569 A1 | 10/2015 | Kohlhoff et al. | |
| 2015/0347820 A1* | 12/2015 | Yin | G06K 9/00221 382/118 |
| 2016/0143421 A1 | 5/2016 | Yamanashi et al. | |
| 2016/0148080 A1* | 5/2016 | Yoo | G06K 9/4628 382/157 |
| 2016/0171346 A1* | 6/2016 | Han | G06K 9/66 382/103 |
| 2016/0275341 A1* | 9/2016 | Li | G06T 13/40 |
| 2016/0371537 A1* | 12/2016 | He | G06K 9/00281 |
| 2017/0083755 A1* | 3/2017 | Tang | G06K 9/00281 |
| 2017/0185870 A1* | 6/2017 | Romanenko | G06T 7/70 |
| 2017/0187987 A1 | 6/2017 | Mukai et al. | |
| 2017/0232334 A1 | 8/2017 | Tokunaga et al. | |
| 2017/0236001 A1 | 8/2017 | McLean | |
| 2017/0262695 A1* | 9/2017 | Ahmed | G06K 9/00288 |
| 2017/0330056 A1* | 11/2017 | Merhav | G06K 9/6277 |
| 2018/0004478 A1 | 1/2018 | Chen | |
| 2018/0032796 A1* | 2/2018 | Kuharenko | G06T 1/20 |
| 2018/0060649 A1* | 3/2018 | Kastaniotis | G06K 9/00288 |
| 2018/0075317 A1* | 3/2018 | Gomez Suarez | G06K 9/4671 |
| 2018/0089534 A1* | 3/2018 | Ye | G06K 9/00295 |
| 2018/0096457 A1* | 4/2018 | Savvides | G06K 9/6267 |
| 2018/0114056 A1* | 4/2018 | Wang | G06K 9/00288 |
| 2018/0182144 A1 | 6/2018 | Imoto et al. | |
| 2018/0204051 A1 | 7/2018 | Li et al. | |
| 2018/0204111 A1* | 7/2018 | Zadeh | G06N 3/0436 |
| 2019/0042895 A1* | 2/2019 | Liang | G06K 9/64 |
| 2019/0156522 A1 | 5/2019 | Sugaya | |
| 2019/0171868 A1* | 6/2019 | Taigman | G06K 9/00295 |
| 2019/0286884 A1* | 9/2019 | Rhee | G06K 9/6271 |
| 2019/0294868 A1* | 9/2019 | Martinez | G06K 9/00275 |

FOREIGN PATENT DOCUMENTS

| | | |
|---|---|---|
| CN | 104361328 | 2/2015 |
| CN | 106028136 | 10/2016 |
| CN | 106056562 | 10/2016 |
| JP | 2012-103941 | 5/2012 |
| KR | 101515928 | 4/2015 |

OTHER PUBLICATIONS

Sun et al., Deep Learning Face Representation from Predicting 10,000 Classes, 2014, 2014 IEEE Conference on Computer Vision and Pattern Recognition, pp. 1-8.*
U.S. non-final Office Action, issued in the U.S. Appl. No. 15/814,076, dated Mar. 5, 2019.
U.S. final Office Action, issued in the U.S. Appl. No. 15/814,076, dated Jul. 30, 2019, 15 pages.
Second Chinese Office Action, issued in the corresponding Chinese patent application 201611008893.X, dated Apr. 27, 2020, 22 pages.
Wang et al., "Synthesis of Face Image With Age Variations", Journal of Optoelectronics, Laser, vol. 17, No. 2, Dec. 2006, 4 pages.
First Chinese Office Action, issued in the corresponding Chinese patent application No. 201611008893.X, dated Jul. 25, 2019, 18 pages.
First Chinese Office Action, issued in the corresponding Chinese patent application No. 201611008892.5, dated Jul. 15, 2019, 16 pages.

* cited by examiner

Second deep convolutional network for face determination

To-be-determined feature vector extraction network

FACIAL IMAGE GENERATING METHOD, FACIAL IMAGE GENERATING APPARATUS, AND FACIAL IMAGE GENERATING DEVICE

CROSS-REFERENCE TO RELATED APPLICATION

This application claims priority to Chinese patent application No. 201611008893.X filed on Nov. 16, 2016, the entire contents of which are incorporated herein by reference.

TECHNICAL FIELD

The present disclosure relates to the technical field of facial image generation, and more particularly to a facial image generating method, a facial image generating apparatus, and a facial image generating device.

BACKGROUND

In the current facial image generation and facial reconstruction, a three-dimensional model is generated from a plurality of two-dimensional pictures of different view angles, and then rendering is performed to obtain a new two-dimensional image.

However, this method of obtaining a new two-dimensional image based on a three-dimensional model has large time-out and low efficiency, and it needs to use pictures of different angles of the same individual to perform three-dimensional modeling, which usually cannot be satisfied in practice. Moreover, this method can only be applied to generation of an image of an already-existing individual at a different angle and with different lighting condition, and this method cannot generate a new facial image.

Therefore, there is a need for a method and an apparatus capable of not only reconstructing, based on a demanded feature, a facial image with the demanded feature from an existing facial image, but also generating a new facial image based on only the demanded feature without basing on the existing facial image.

SUMMARY

In view of the above problem, the present disclosure is proposed to provide a facial image generating method and a facial image generating apparatus, a facial image is generated by use of a deep convolutional network for facial image generation based on a facial feature vector and a demanded feature vector, a facial image with a specific feature can be generated without using the three-dimensional model.

According to an aspect of the present disclosure, there is provided a facial image generating method, comprising: generating an M-dimensional facial feature vector, M being an integer larger than one; linking the M-dimensional facial feature vector with an N-dimensional demanded feature vector to generate a synthesized feature vector, N being an integer larger than or equal to one; and generating a synthesized facial image by use of a deep convolutional network for facial image generation and based on the synthesized feature vector.

In addition, according to an embodiment of the present disclosure, the facial image generating method further comprises: generating a demand satisfaction score based on the synthesized facial image and the demanded feature vector and by use of a deep convolutional network for demand determination; and updating parameters of the deep convolutional network for facial image generation and the deep convolutional network for demand determination based on the demand satisfaction score.

In addition, according to an embodiment of the present disclosure, in the case of extracting the facial feature vector from the given facial image, the facial image generating method further comprises: generating a face matching score based on the synthesized facial image and the given facial image and by use of a first deep convolutional network for face determination; and updating parameters of the deep convolutional network for facial feature extraction, the deep convolutional network for facial image generation, and the first deep convolutional network for face determination based on the face matching score.

In addition, according to an embodiment of the present disclosure, in the case of randomly generating the facial feature vector, the facial image generating method further comprises: generating a face satisfaction score based on the synthesized facial image and by use of a second deep convolutional network for face determination; and updating parameters of the deep convolutional network for facial image generation and the second deep convolutional network for face determination based on the face satisfaction score.

According to another aspect of the present disclosure, there is provided a facial image generating apparatus, comprising: a facial feature generating module configured to generate an M-dimensional facial feature vector, M being an integer larger than one; a vector synthesizing module configured to link the M-dimensional facial feature vector with an N-dimensional demanded feature vector to generate a synthesized feature vector, N being an integer larger than or equal to one; and a synthesized facial image generating module configured to generate a synthesized facial image by use of a deep convolutional network for facial image generation and based on the synthesized feature vector.

In addition, according to an embodiment of the present disclosure, the facial image generating apparatus further comprises: a demand determining module configured to generate a demand satisfaction score based on the synthesized facial image and the demanded feature vector and by use of a deep convolutional network for demand determination; and a first parameter adjusting module configured to update parameters of the deep convolutional network for facial image generation and the deep convolutional network for demand determination based on the demand satisfaction score.

In addition, according to an embodiment of the present disclosure, in the case of extracting the facial feature vector from the given facial image, the facial image generating apparatus further comprises: a first face determining module configured to generate a face matching score based on the synthesized facial image and the given facial image and by use of a first deep convolutional network for face determination; and a second parameter adjusting module configured to update parameters of the deep convolutional network for facial feature extraction, the deep convolutional network for facial image generation, and the first deep convolutional network for face determination based on the face matching score.

In addition, according to an embodiment of the present disclosure, in the case of randomly generating the facial feature vector, the facial image generating apparatus further comprises: a second face determining module configured to generate a face satisfaction score based on the synthesized facial image and by use of a second deep convolutional network for face determination; and a third parameter adjusting module configured to update parameters of the deep convolutional network for facial image generation and the second deep convolutional network for face determination based on the face satisfaction score.

According to an embodiment of the present disclosure, there is provided a facial image generating device, comprising: one or more processors; one or more memories for storing program instructions, the program instructions being executed by the processors to perform the following steps: generating an M-dimensional facial feature vector, M being an integer larger than one; linking the M-dimensional facial feature vector with an N-dimensional demanded feature vector to generate a synthesized feature vector, N being an integer larger than or equal to one; and generating a synthesized facial image by use of a deep convolutional network for facial image generation and based on the synthesized feature vector.

According to an embodiment of the present disclosure, a facial image is generated by use of a deep convolutional network for facial image generation and based on a facial feature vector and a demanded feature vector, a facial image with a specific feature prescribed by the demanded feature vector can be generated fast without using the three-dimensional model.

In addition, according to an embodiment of the present disclosure, after a synthesized facial image is generated, whether the generated synthesized facial image satisfies requirements of the demanded feature vector is determined and the corresponding demand satisfaction score is generated by use of the deep convolutional network for demand determination, and further, parameters of the deep convolutional network for facial image generation and the deep convolutional network for demand determination are updated based on the demand satisfaction score, thereby the deep convolutional network for facial image generation and the deep convolutional network for demand determination can be trained in synchronization.

In addition, according to an embodiment of the present disclosure, after a synthesized facial image is generated, whether the generated synthesized facial image is a facial image or whether the generated synthesized facial image and the given facial image belong to the same face is determined and the corresponding face satisfaction score or face matching score is generated by use of the deep convolutional network for face determination, and further, parameters of the deep convolutional network for facial image generation and the deep convolutional network for face determination are updated based on the generated face satisfaction score or the generated face matching score, thereby the deep convolutional network for facial image generation and the deep convolutional network for face determination can be trained in synchronization.

BRIEF DESCRIPTION OF THE DRAWINGS

Through the more detailed description of the embodiments of the present disclosure in combination with the accompanying drawings, the above and other objects, features, and advantages of the present disclosure will become more apparent. The drawings are shown to provide further understanding for the embodiments of the present disclosure and constitute a portion of the specification, and are intended to illustrate the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Figure 1:
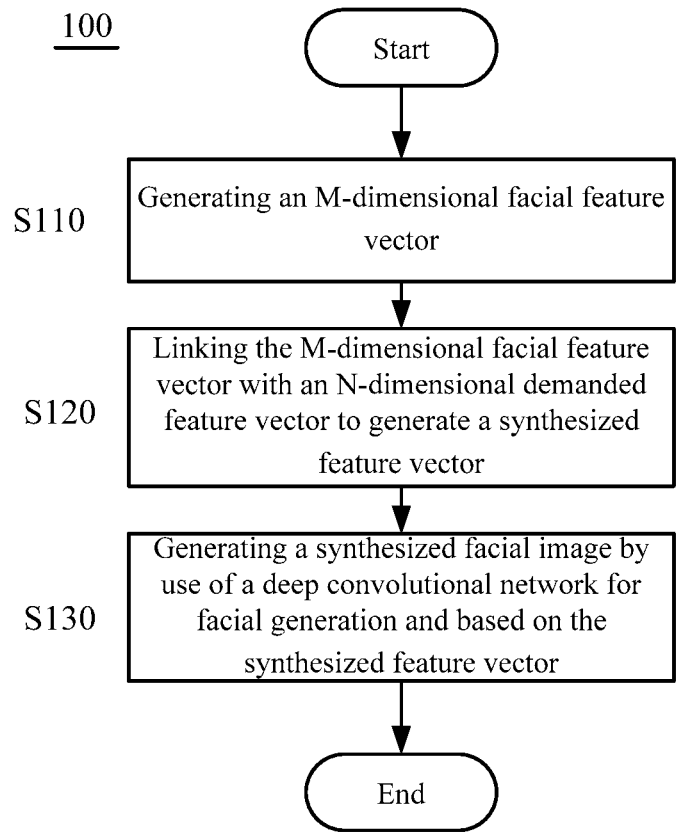
FIG. 1 is a schematic flowchart of a facial image generating method according to an embodiment of the present disclosure.

FIG. 1 is a schematic flowchart of a facial image generating method 100 according to an embodiment of the present disclosure.

In step S110, an M-dimensional facial feature vector is generated, M being an integer larger than one. Preferably, the facial feature vector is a high dimensional feature vector.

According to an embodiment of the present disclosure, the facial feature vector may be extracted from a given facial image. For example, the facial feature vector may be extracted from a given facial image by use of a deep convolutional network for facial feature extraction according to an embodiment of the present disclosure. Alternatively, according to an embodiment of the present invention, the facial feature vector may be randomly generated, and in this case, the facial feature vector represents a randomly generated face.

For example, a value of each dimension of the M-dimensional facial feature vector is a real number in a range of (−1, 1) or a real number in a range of (0, 1).

In step S120, the M-dimensional facial feature vector is linked with an N-dimensional demanded feature vector to generate a synthesized feature vector, N being an integer larger than or equal to one.

For example, a value of each dimension of the N-dimensional demanded feature vector is a real number in a range of (−1, 1) or a real number in a range of (0, 1), and represents a different demand, for example, whether glasses were worn, whether there are bangs, light intensity, face rotation angle and so on.

According to an embodiment of the present disclosure, the M-dimensional facial feature vector is linked with an N-dimensional demanded feature vector to generate an (M+N)-dimensional synthesized feature vector. For example, the N-dimensional demanded feature vector may be placed after the M-dimensional facial feature vector or before the M-dimensional facial feature vector, or may be inserted into the M-dimensional facial feature vector.

In step S130, a synthesized facial image is generated by use of a deep convolutional network for facial image generation and based on the synthesized feature vector.

Figure 2:
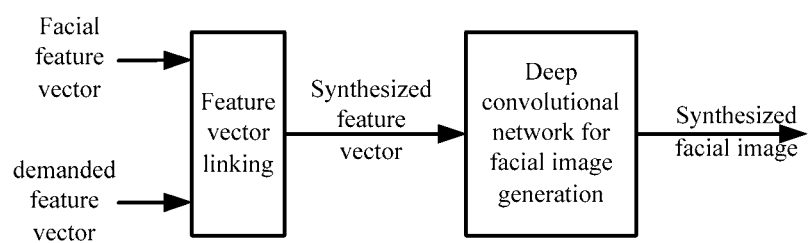
FIG. 2 is a schematic diagram of the principle of generating a synthesized facial image based on a facial feature vector and a demanded feature vector according to an embodiment of the present disclosure.

FIG. 2 shows a schematic diagram of the principle of generating a synthesized facial image based on a facial feature vector and a demanded feature vector according to an embodiment of the present disclosure.

First, the facial feature vector and the demanded feature vector are linked to generate a synthesized feature vector. For example, an M-dimensional facial feature vector and an N-dimensional demanded vector feature are linked to generate an (M+N)-dimensional synthesized feature vector. Thereafter, the deep convolutional network for facial image generation generates a synthesized facial image based on the (M+N)-dimensional synthesized feature vector.

Figure 3A:
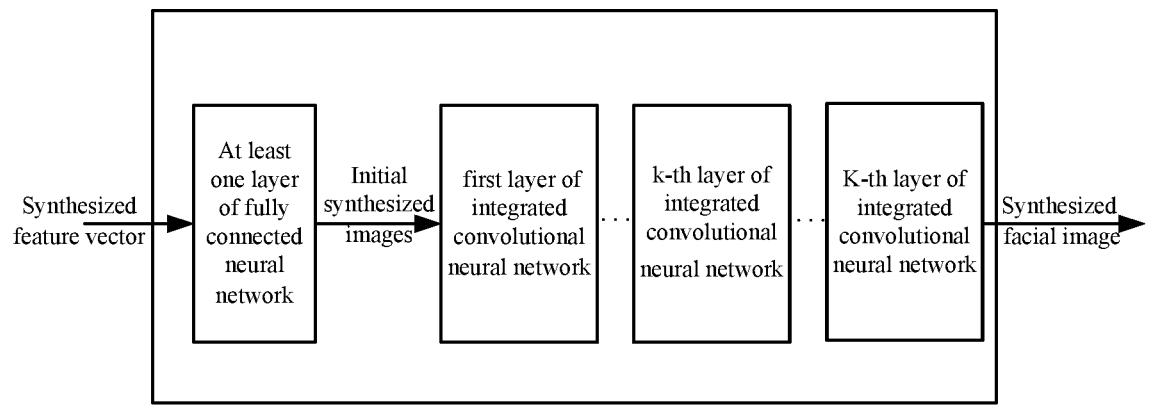
FIG. 3A is a schematic diagram of structure of a deep convolutional network for facial image generation according to an embodiment of the present disclosure.
Figure 3B:
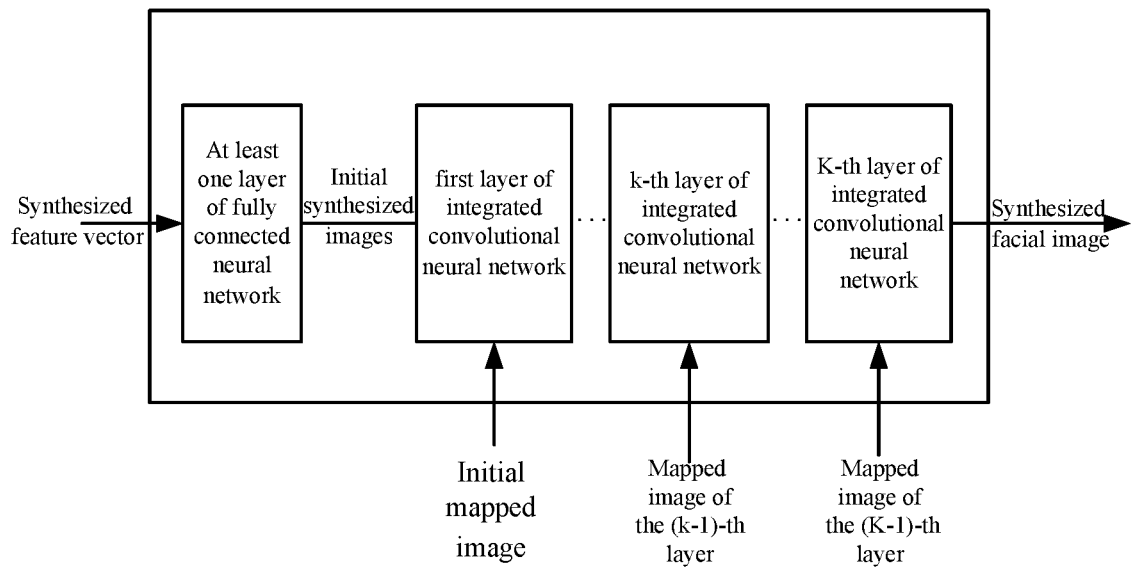
FIG. 3B is another schematic diagram of structure of a deep convolutional network for facial image generation according to an embodiment of the present disclosure.

FIG. 3A shows a schematic diagram of structure of a deep convolutional network for facial image generation according to an embodiment of the present disclosure, FIG. 3B shows another schematic diagram of structure of a deep convolutional network for facial image generation according to an embodiment of the present disclosure.

As shown in FIGS. 3A and 3B, the deep convolutional network for facial image generation comprises at least one layer of fully connected neural network and K layers of integrated convolutional neural network, K being an integer larger than or equal to two. The number of layers K of the integrated convolutional neural network is determined by a size of the synthesized facial image, the bigger the size of the synthesized facial image is, the higher the number of layers K of the integrated convolutional neural network is. For example, the size of the synthesized facial image is 256×256, the required number of layers of the integrated convolutional neural network is 3 layers; the size of the synthesized facial image is 128×128, the required number of layers of the integrated convolutional neural network is 2 layers.

As shown in FIG. 3A, the at least one layer of fully connected neural network is used to receive the synthesized feature vector, and generate initial synthesized images based on the synthesized feature vector. Thereafter, a first layer of integrated convolutional neural network receives the initial synthesized images outputted from the at least one layer of fully connected neural network and generates synthesized images of the first layer; a k-th layer of integrated convolutional neural network receives synthesized images of a (k−1)-th layer outputted from the (k−1)-th layer of integrated convolutional neural network and generates synthesized images of the k-th layer, k being an integer larger than or equal to two and smaller than or equal to K, a size (resolution) of the synthesized images of the k-th layer is larger than a size (resolution) of the synthesized images of the (k−1)-th layer, and a number (channel number) of the synthesized images of the k-th layer is smaller than a number (channel number) of the synthesized images of the (k−1)-th layer; last, a K-th layer of integrated convolutional neural network receives synthesized images of a (K−1)-th layer outputted from a (K−1)-th layer of integrated convolutional neural network and generates synthesized images of a K-th layer, and the synthesized images of the K-th layer is taken as the synthesized facial image.

As shown in FIG. 3B, the at least one layer of fully connected neural network is used to receive the synthesized feature vector, and generate initial synthesized images based on the synthesized feature vector. Thereafter, a first layer of integrated convolutional neural network not only can receive the initial synthesized images from the at least one layer of fully connected neural network but also can receive initial mapped images generated by mapping from the demanded feature vector, and generate synthesized images of the first layer based on the initial synthesized images and the initial mapped images, a size of the initial synthesized images is the same as a size of the initial mapped images; likewise, a k-th layer of integrated convolutional neural network not only can receive synthesized images of a (k−1)-th layer outputted from the (k−1)-th layer of integrated convolutional neural network, but also can receive mapped images of the (k−1)-th layer generated by mapping from the demanded feature vector, and generate synthesized images of the k-th layer based on the synthesized images of the (k−1)-th layer and the mapped images of the (k−1)-th layer, a size of the synthesized images of the (k−1)-th layer is the same as a size of the mapped images of the (k−1)-th layer, a size (resolution) of the synthesized images of the k-th layer is larger than a size (resolution) of the synthesized images of the (k−1)-th layer, and a number (channel number) of the synthesized images of the k-th layer is smaller than a number (channel number) of the synthesized images of the (k−1)-th layer; last, a K-th layer of integrated convolutional neural network receives synthesized images of a (K−1)-th layer as outputted from the (K−1)-th layer of integrated convolutional neural network, and also receives mapped images of the (K−1)-th layer generated by mapping from the demanded feature vector, and generates the synthesized images of the K-th layer based on the synthesized images of the (K−1)-th layer and the mapped images of the (K−1)-th layer, and the synthesized images of the K-th layer is taken as the synthesized facial image, a size of the synthesized images of the (K−1)-th layer is the same as a size of the mapped images of the (K−1)th layer.

As will be appreciated, the initial synthesized images comprise a plurality of initial synthesized images, for example, 128 (channels) initial synthesized images with a size (resolution) of 32×32; the initial mapped images comprise N initial mapped images, each dimensional of the N-dimensional demanded feature vector corresponds to one of the initial mapped images, separately. For example, a value of a certain dimension of the N-dimensional demanded feature vector is a, then a value of each pixel of the corresponding initial mapped images with a size of 32×32 is a. Hereinafter, for the sake of simplification and uniformity, the initial synthesized images are referred to as the synthesized images of the zero layer and the initial mapped images is referred to as the mapped images of the zero layer.

As will be appreciated, any layer (the k-th layer, k being an integer larger than or equal to one and smaller than or equal to K) of integrated convolutional neural network in the K layers of integrated convolutional neural network can generate the synthesized images of this layer based on the synthesized images received by it, or generate the synthesized images of this layer based on the synthesized images of the (k−1)-th layer and the mapped images of the (k−1)-th layer received by it. In addition, it should be understood that, the mapped images of the (k−1)-th layer also comprises N mapped images of the (k−1)-th layer, each dimension of the N-dimensional demanded feature vector corresponds to one of the mapped images of the (k−1)-th layer, separately.

Figure 4A:
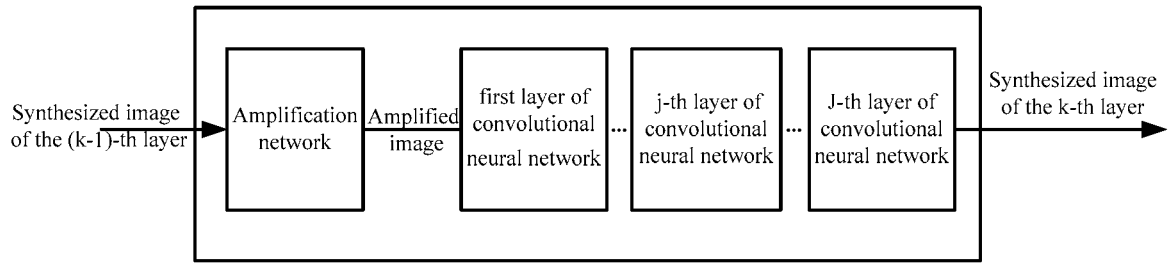
FIG. 4A is a schematic diagram of structure of an integrated convolutional neural network corresponding to FIG. 3A according to an embodiment of the present disclosure.

FIG. 4A shows a schematic diagram of structure of an integrated convolutional neural network corresponding to FIG. 3A according to an embodiment of the present disclosure.

As shown in FIG. 4A, each layer of integrated convolutional neural network comprises an amplification network and J layers of convolutional neural networks, J being an integer larger than or equal to two. Hereinafter, for convenience of description, the integrated convolutional neural network shown in FIG. 4A is referred to as the integrated convolutional neural network of the k-th layer.

Corresponding to the deep neural network for facial image generation shown in FIG. 3A, the integrated convolutional neural network of the k-th layer as shown in FIG. 4A receives synthesized images of a (k−1)-th layer, k being an integer larger than or equal to one and smaller than or equal to K. Specifically, the amplification network receives the synthesized images of the (k−1)-th layer and amplifies the synthesized images of the (k−1)-th layer to generate amplified images; thereafter, a first layer of convolutional neural network receives the amplified images and generates intermediate images of the first layer; likewise, a j-th layer of convolutional neural network receives intermediate images of a (j−1)-th layer from the (j−1)-th layer of convolutional neural network and generates intermediate images of the j-th layer, a size of the intermediate images of the j-th layer is the same as a size of the intermediate images of the (j−1)-th layer, a number (channel number) of the intermediate images of the j-th layer may be larger than, equal to, or smaller than a number (channel number) of the intermediate images of the (j−1)-th layer, j being an integer larger than or equal to two and smaller than or equal to J; last, a J-th layer of convolutional neural network receives intermediate images of a (J−1)-th layer and generates intermediate images of the J-th layer, which is taken as synthesized images of the k-th layer outputted by the k-th layer of integrated convolutional neural network.

For example, the amplification network amplifies the received synthesized images of the (k−1)-th layer two times, that is, it is assumed that a size of the synthesized images of the (k−1)-th layer is 32×32, then a size of the amplified images generated by the amplification network is 64×64. It should be understood that, a number (channel number) of the amplified images generated by the amplification network is the same as a number (channel number) the synthesized images of the (k−1)-th layer, and a number (channel number) of the synthesized images of the k-th layer as generated by the k-th layer of integrated convolutional neural network is smaller than a number (channel number) of the synthesized images of the (k−1)-th layer. For example, the number (channel number) of the synthesized images of the k-th layer as generated by the k-th layer of integrated convolutional neural network is usually ½, ⅓ and so on of the number (channel number) of the synthesized images of the (k−1)-th layer.

Figure 4B:
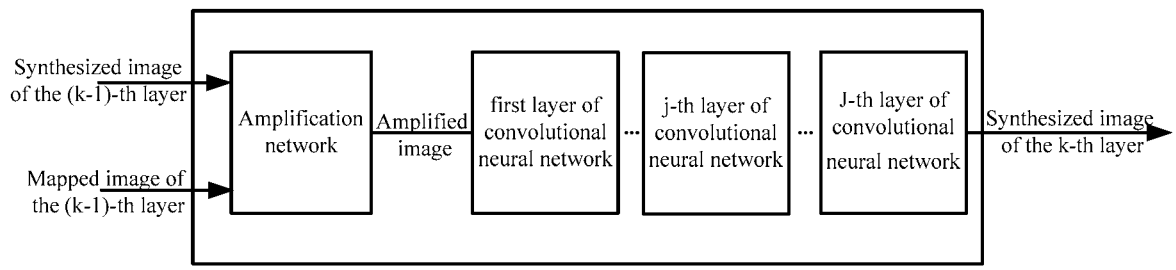
FIG. 4B is a schematic diagram of structure of an integrated convolutional neural network corresponding to FIG. 3B according to an embodiment of the present disclosure.

FIG. 4B shows a schematic diagram of structure of an integrated convolutional neural network corresponding to FIG. 3B according to an embodiment of the present disclosure.

As shown in FIG. 4B, each layer of integrated convolutional neural network comprises an amplification network and J layers of convolutional neural networks, J being an integer larger than or equal to two. Hereinafter, for convenience of description, the integrated convolutional neural network shown in FIG. 4B is referred to as the integrated convolutional neural network of the k-th layer.

Corresponding to the deep convolutional neural network for facial image generation shown in FIG. 3B, the k-th layer of integrated convolutional neural network as shown in FIG. 4B receives synthesized images of a (k−1)-th layer and also mapped images of the (k−1)-th layer, k being an integer larger than or equal to one and smaller than or equal to K. Specifically, the amplification network receives the synthesized images of the (k−1)-th layer and the mapped images of the (k−1)-th layer, and amplifies the synthesized images of the (k−1)-th layer and the mapped images of the (k−1)-th layer to generate amplified images, thereafter a first layer of convolutional neural network receives the amplified images and generates intermediate images of the first layer; likewise, a j-th layer of convolutional neural network receives intermediate images of a (j−1)-th layer from the (j−1)-th layer of convolutional neural network and generates intermediate images of a j-th layer, a size of the intermediate images of the j-th layer is the same as a size of the intermediate images of the (j−1)-th layer, and a number (channel number) of the intermediate images of the j-th layer may be smaller than, equal to, or larger than a number (channel number) of the intermediate images of the (j−1)-th layer, j being an integer larger than or equal to two and smaller than or equal to J; last, a J-th layer of convolutional neural network receives intermediate images of an (J−1)-th layer and generates intermediate images of a J-th layer, the intermediate images of the J-th layer is taken as the synthesized images of the k-th layer outputted by the k-th layer of integrated convolutional neural network.

Figure 4C:
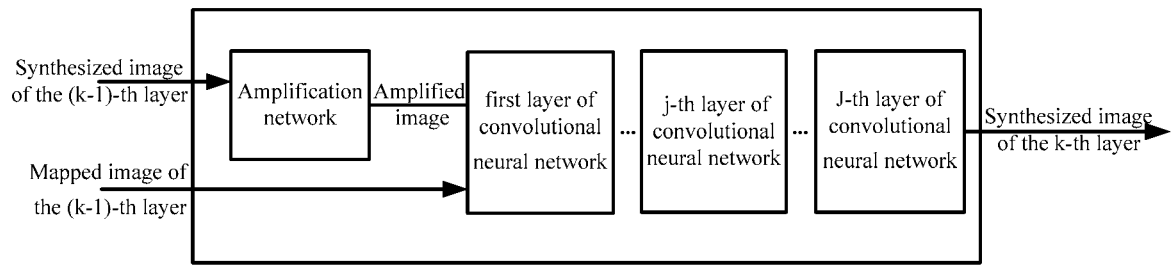
FIG. 4C is another schematic diagram of structure of an integrated convolutional neural network corresponding to FIG. 3B according to an embodiment of the present disclosure.

FIG. 4C shows another schematic diagram of structure of an integrated convolutional neural network corresponding to FIG. 3B according to an embodiment of the present disclosure.

Different than inputting the mapped images of the (k−1)-th layer into the amplification network shown in FIG. 4B, the mapped images of the (k−1)-th layer are inputted into the first layer of convolutional neural network in FIG. 4C. In this case, a size of the mapped images of the (k−1)-th layer is the same as a size of the amplified images outputted by the amplification network. The first layer of convolutional neural network receives the amplified images and the mapped images of the (k−1)-th layer and generates intermediate images of the first layer; likewise a j-th layer of convolutional neural network receives intermediate images of a (j−1)-th layer and generates intermediate images of the j-th layer, last, an J-th layer of convolutional neural network receives intermediate images of a (J−1)-th layer and generates intermediate images of the J-th layer, the intermediate images of the J-th layer is taken as synthesized images of the k-th layer outputted by the k-th layer of integrated convolutional neural network.

Optionally, besides the first layer of convolutional neural network, the mapped images of the (k−1)-th layer may be also inputted to any layer among the J layers of convolutional neural network. It should be noted that, no matter the mapped images of the (k−1)-th layer are inputted to which layer of convolutional neural network, a size of the mapped images of the (k−1)-th layer inputted to said layer is the same as a size of the intermediate images inputted to said layer.

According to an embodiment of the present disclosure, after the deep convolutional network for facial image generation generates the synthesized facial image, the generated facial image is further evaluated, and, optionally, parameters of the deep convolutional network for facial image generation and the deep convolutional network for face determination can be updated according to an evaluation result.

Figure 5A:
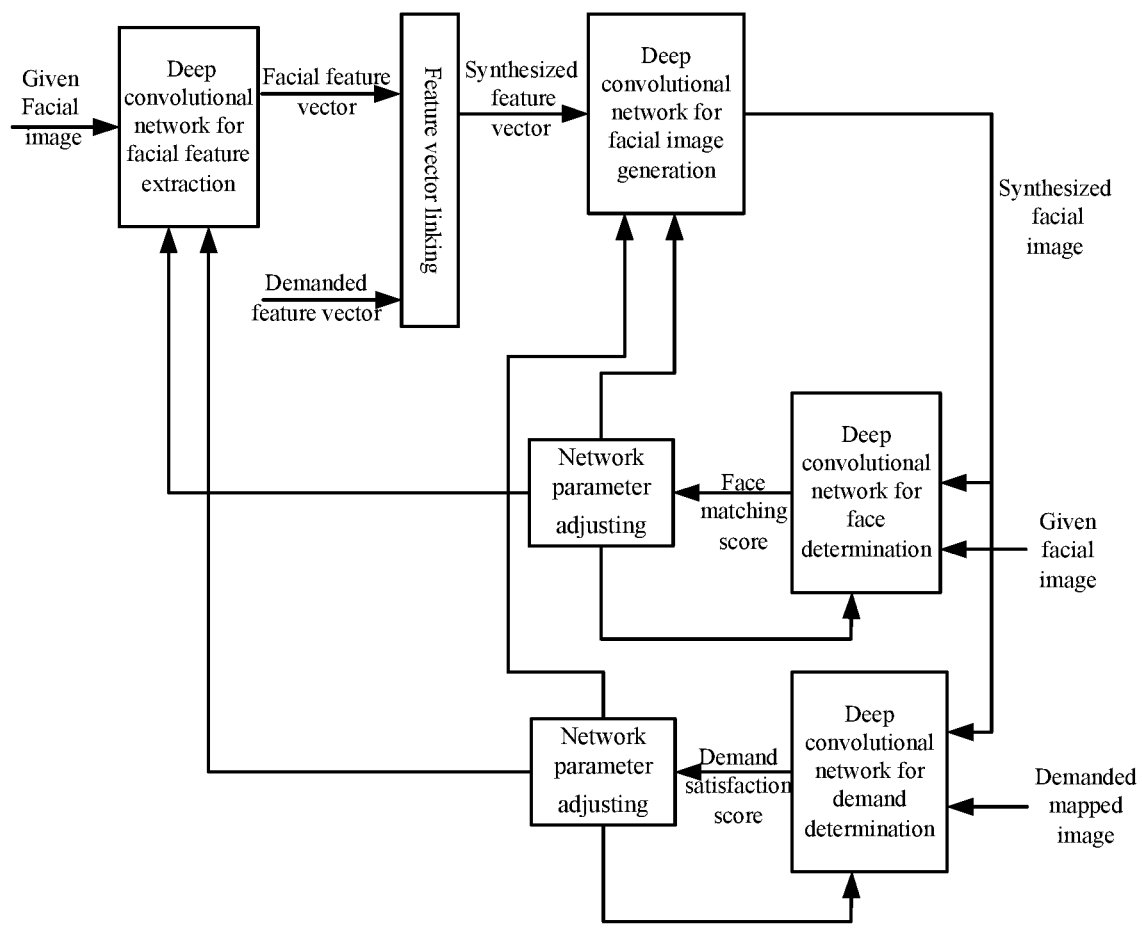
FIG. 5A is a schematic diagram of the principle of facial image generation and determination process according to a first embodiment of the present disclosure.

FIG. 5A shows a schematic diagram of the principle of facial image generation and determination process according to a first embodiment of the present disclosure.

In a first embodiment of the present application, the facial feature vector is extracted from a given facial image by use of a deep convolutional network for facial feature extraction.

Figure 6:
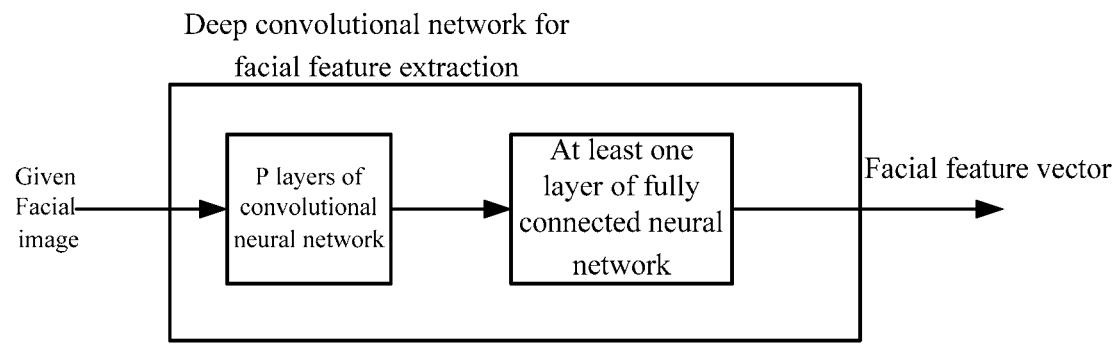
FIG. 6 is a schematic diagram of structure of a deep convolutional network for facial feature extraction according to the first embodiment of the present disclosure.

FIG. 6 shows a schematic diagram of structure of a deep convolutional network for facial feature extraction according to the first embodiment of the present disclosure.

According to the first embodiment of the present disclosure, the deep convolutional network for facial feature extraction comprises: P layers of convolutional neural network and at least one layer of fully connected neural network, P being an integer larger than or equal to two.

A first layer of convolutional neural network of the P layers of convolutional neural network is used to receive the given facial image, the given facial image for example is three (channels) given facial images with a size of 128×128, for example, given facial images with a size of 128×128 in R channel, G channel, and B channel, a number (channel number) of the intermediate images generated by the first layer of convolutional neural network is bigger than a number (channel number) of the given facial image, and a size of the intermediate images generated by the first layer of convolutional neural network is smaller than a size of the given facial image, a P-th layer of convolutional neural network outputs a plurality of small images, for example 128 small images whose size is 4×4 or 8×8. Last, the at least one layer of fully connected neural network is used to receive the plurality of small images outputted from the P-th layer of convolutional neural network and generate the facial feature vector.

According to the first embodiment of the present disclosure, after the deep convolutional neural network for facial image generation generates the synthesized facial image, a demand satisfaction score may be generated based on the synthesized facial image and the demanded feature vector by use of a deep convolutional network for demand determination, so as to determine whether the synthesized facial image satisfies requirements of the demanded feature vector. In addition, further, parameters of the deep convolutional network for facial feature extraction, the deep convolutional network for facial image generation, and the deep convolutional network for demand determination may be updated based on the demand satisfaction score.

In addition, according to the first embodiment of the present disclosure, after the deep convolutional neural network for facial image generation generates the synthesized facial image, a face matching score may be generated based on the synthesized facial image and the given facial image by use of a deep convolutional network for face determination, so as to determine whether the synthesized facial image and the given facial image belong to the same face. In addition, further, parameters of the deep convolutional network for facial feature extraction, the deep convolutional network for facial image generation, and the deep convolutional network for face determination may be updated based on the face matching score.

Figure 5B:
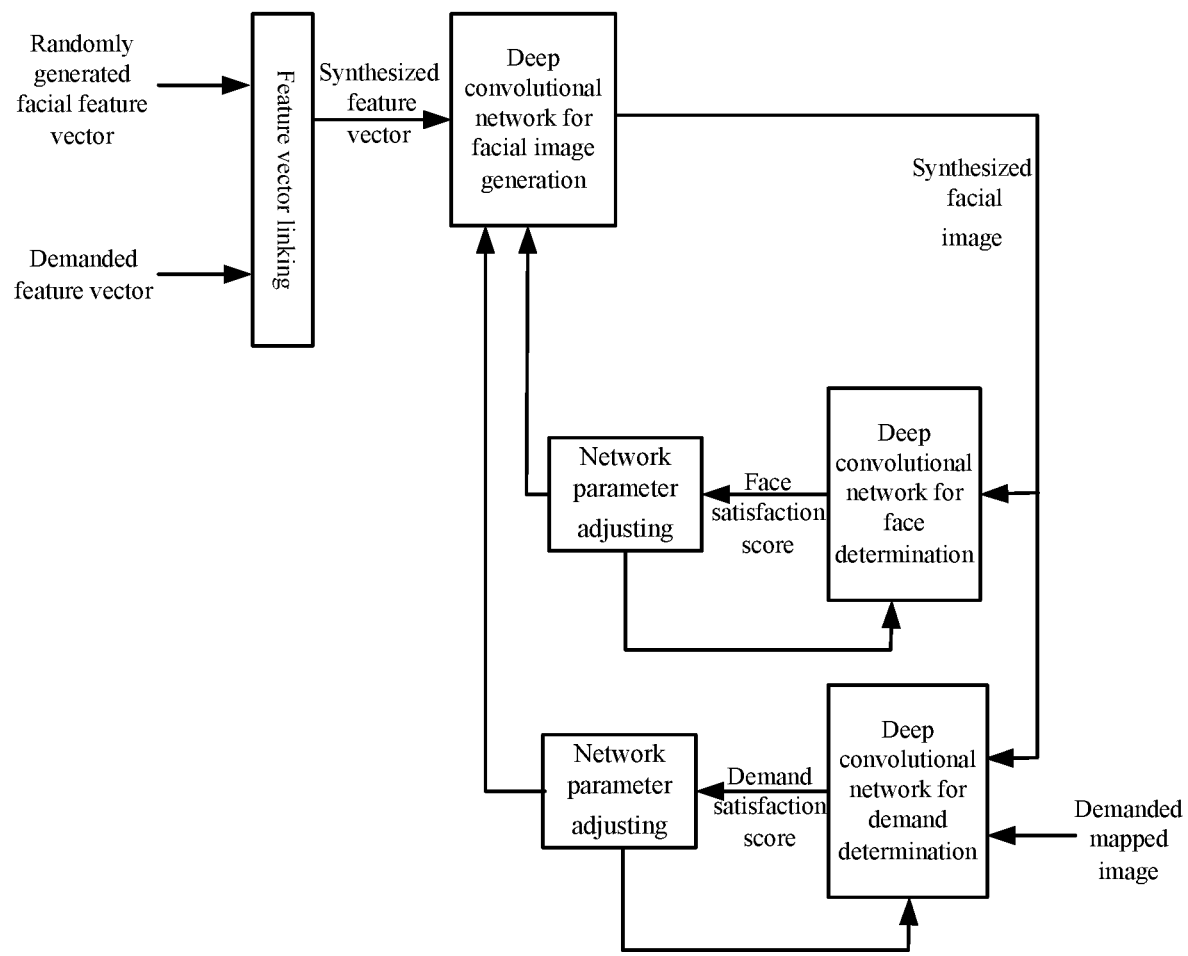
FIG. 5B is a schematic diagram of the principle of facial image generation and determination process according to a second embodiment of the present disclosure.

FIG. 5B shows a schematic diagram of the principle of facial image generation and determination process according to a second embodiment of the present disclosure.

In a second embodiment of the present disclosure, a facial feature vector is generated randomly.

According to the second embodiment of the present disclosure, after the deep convolutional neural network for facial image generation generates the synthesized facial image, a face satisfaction score may be generated based on the synthesized facial image by use of a deep convolutional network for face determination. In addition, further, parameters of the deep convolutional network for facial image generation and the deep convolutional network for face determination may be updated based on the face satisfaction score.

In addition, according to the second embodiment of the present disclosure, after the deep convolutional neural network for facial image generation generates the synthesized facial image, a demand satisfaction score may be generated based on the synthesized facial image and the demanded feature vector by use of the deep convolutional network for demand determination, so as to determine whether the synthesized facial image satisfies requirements of the demanded feature vector. In addition, further, parameters of the deep convolutional network for facial image generation and the deep convolutional network for demand determination may be updated based on the demand satisfaction score.

According to an embodiment of the present disclosure, a gradient descent method may be used to update parameters of each network, for example, back propagation algorithm may be used to calculate a gradient of each parameter.

Figure 7A:
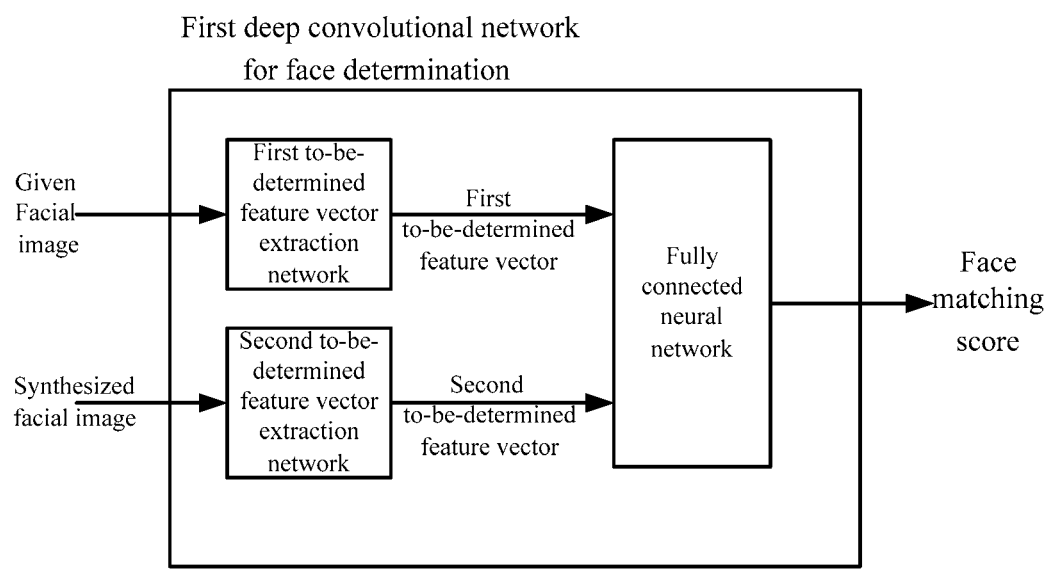
FIG. 7A is a schematic block diagram of structure of a first deep convolutional network for face determination according to the first embodiment of the present disclosure.

FIG. 7A shows a schematic block diagram of structure of a first deep convolutional network for face determination according to the first embodiment of the present disclosure.

As shown in FIG. 7A, the first deep convolutional network for face determination comprises a first to-be-determined feature vector extraction network, a second to-be-determined feature vector extraction network, and a fully connected neural network.

The first to-be-determined feature vector extraction network is used to extract a first to-be-determined feature vector from the given facial image, the second to-be-determined feature vector extraction network is used to extract a second to-be-determined feature vector from the synthesized facial image, and the fully connected neural network is used to generate the face matching score based on the first to-be-determined feature vector and the second to-be-determined feature vector.

Parameters of the first to-be-determined feature vector extraction network are the same as parameters of the second to-be-determined feature vector extraction network, a dimension number of the first to-be-determined feature vector is the same as a dimension number of the second to-be-determined feature vector, but larger than a dimensional number of the facial feature vector extracted by the deep convolutional network for facial feature extraction from the given facial image. For example, the dimension number of the first to-be-determined feature vector and the dimension number of the second to-be-determined feature vector both are 1000 dimensions, a value range of the face matching score is a real number between 0 and 1.

Figure 7B:
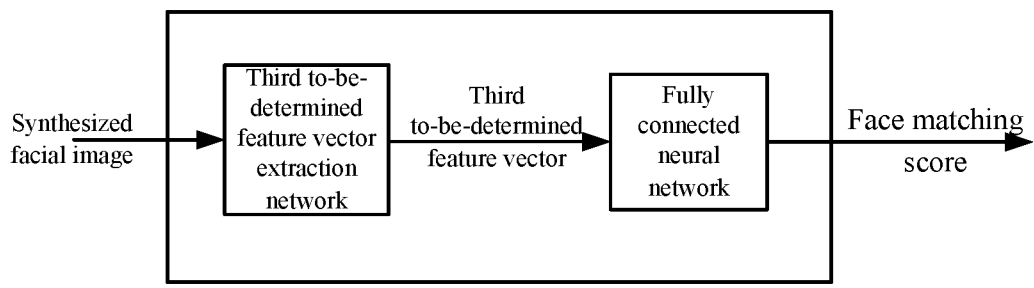
FIG. 7B is a schematic block diagram of structure of a second deep convolutional network for face determination according to the second embodiment of the present disclosure.

FIG. 7B shows a schematic block diagram of structure of a second deep convolutional network for face determination according to the second embodiment of the present disclosure.

As shown in FIG. 7B, the second deep convolutional network for face determination comprises a third to-be-determined feature vector extraction network and a fully connected neural network.

The third to-be-determined feature vector extraction network is used to extract a third to-be-determined feature vector from the synthesized facial image, and the fully connected neural network is used to generate the face satisfaction score based on the third to-be-determined feature vector, wherein a dimension number of the third to-be-determined feature vector is larger than a dimension number of the facial feature vector.

Parameters of the third to-be-determined feature vector extraction network in FIG. 7B may be the same as parameters of the second to-be-determined feature vector extraction network in FIG. 7A, or the third to-be-determined feature vector extraction network in FIG. 7B may be the same network as the second to-be-determined feature vector extraction network in FIG. 7A, but parameters of the fully connected neural network in FIG. 7B are different than parameters of the fully connected neural network in FIG. 7A.

Figure 8:
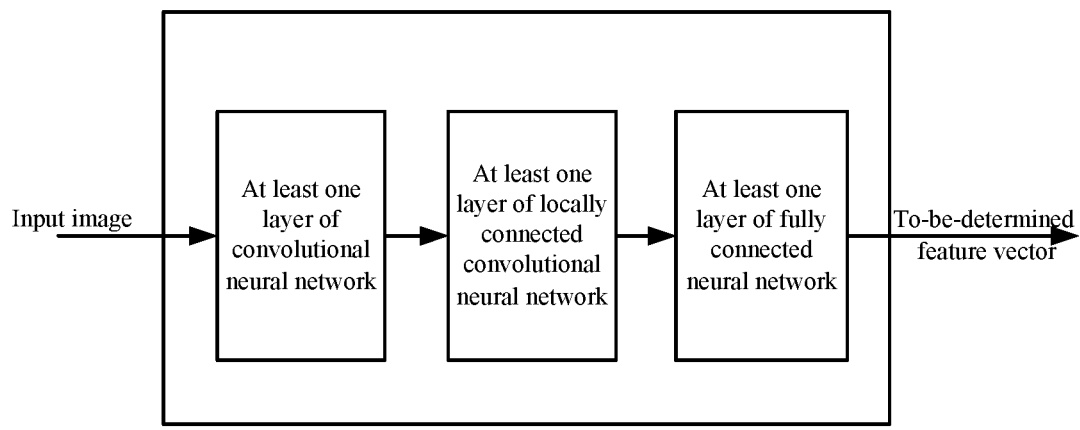
FIG. 8 is a schematic diagram of structure of a to-be-determined feature vector extraction network according to an embodiment of the present disclosure.

FIG. 8 shows a schematic diagram of structure of a to-be-determined feature vector extraction network according to an embodiment of the present disclosure.

According to an embodiment of the present disclosure, a to-be-determined feature vector extraction network comprises at least one layer of convolutional neural network, at least one layer of locally connected convolutional neural network, and at least one layer of fully connected neural network.

A first layer of convolutional neural network is used to receive an input image, the at least one layer of convolutional neural network is cascaded, and a last layer of convolutional neural network is connected to a first layer of locally connected convolutional neural network, the at least one layer of locally connected convolutional neural network is cascaded, a last layer of locally connected convolutional neural network is connected to a first layer of fully connected neural network, the at least one fully connected neural network is cascaded, and a last layer of fully connected neural network outputs a to-be-determined feature vector.

The first to-be-determined feature vector extraction network and the second to-be-determined feature vector extraction network in FIG. 7A according to the first embodiment of the present disclosure and the third to-be-determined feature vector extraction network in FIG. 7B according to the second embodiment of the present disclosure may adopt the structure as shown in FIG. 8.

Specifically, the first layer of convolutional neural network of the first to-be-determined feature vector extraction network in FIG. 7A is used to receive the given facial image as its input image, and the last layer of fully connected neural network thereof outputs the first to-be-determined feature vector; the first layer of convolutional neural network of the second to-be-determined feature vector extraction network in FIG. 7A is used to receive the synthesized facial image as its input image, and the last layer of fully connected neural network thereof outputs the second to-be-determined feature vector.

Specifically, the first layer of convolutional neural network of the third to-be-determined feature vector extraction network in FIG. 7B is used to receive the synthesized facial image as its input image, and the last layer of fully connected neural network thereof outputs the third to-be-determined feature vector.

Figure 9:
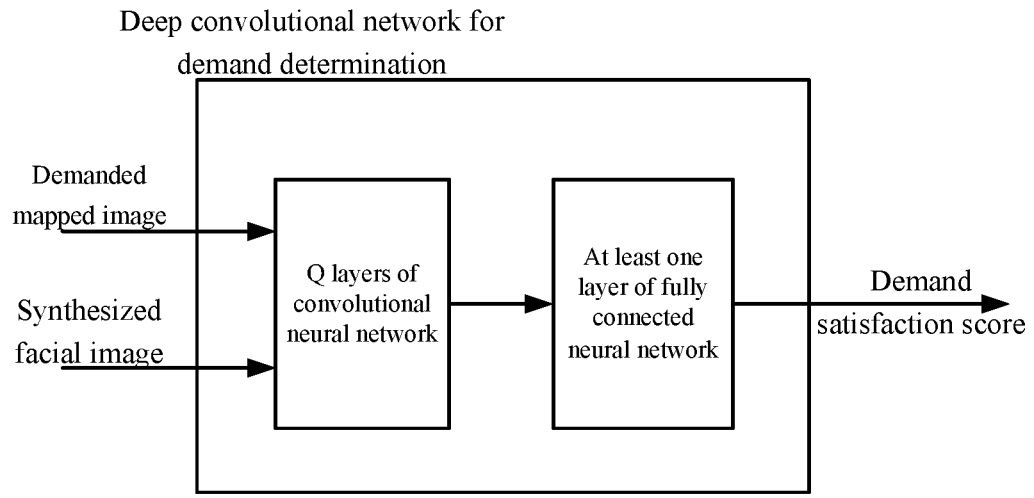
FIG. 9 is a schematic diagram of structure of a deep convolutional network for demand determination according to an embodiment of the present disclosure.

FIG. 9 shows a schematic diagram of structure of a deep convolutional network for demand determination according to an embodiment of the present disclosure.

As shown in FIG. 9, the deep convolutional network for demand determination according to an embodiment of the present disclosure comprises Q layers of convolutional neural network and at least one layer of fully connected neural network.

A first layer of convolutional neural network in the Q layers of convolutional neural network is used to receive the synthesized facial image and the demanded mapped images, a size of the demanded mapped images is the same as a size of the synthesized facial image, the synthesized facial image comprises for example three (channels) synthesized facial images with a size of 128×128, that is, the synthesized facial image with a size of 128×128 in R channel, the synthesized facial image with a size of 128×128 in G channel, the synthesized facial image with a size of 128×128 in B channel, the demanded mapped images comprise N (channels) of demanded mapped images with a resolution of 128×128, each dimension in the N-dimensional demanded feature vector corresponds to one of the demanded mapped images, separately, and a value of each pixel in this demanded mapped image is the value of this dimension. A Q-th layer of convolutional neural network of the Q layers of convolutional neural network outputs a plurality (channels) of small images whose size is 4×4 or 8×8.

Thereafter, the at least one layer of fully connected neural network is used to generate a demand satisfaction score based on the plurality of small images whose size is 4×4 or 8×8.

In addition, in one exemplary implementation of the embodiment of the present disclosure, in the deep convolutional network for facial feature extraction, the deep convolutional network for facial feature generation, the integrated convolutional neural network, the deep convolutional network for face determination, the to-be-determined feature vector extraction network, and the deep convolutional network for demand determination described above, a non-linear function layer is nested on the last layer of convolutional neural network in each of said networks, and except the last layer of convolutional neural network in each of said networks, a normalized non-linear function layer is nested on each layer of convolutional neural network in each of said networks. Those skilled in the art can implement such non-linear function layer and such normalized non-linear functional layer by using the relevant methods in the prior art, no details are described here, and the present disclosure is not subject to limitations of specific normalization methods and non-linear functions. The embodiment using this exemplary implementation has better technical effect in comparison to other embodiments, i.e. the synthesized face satisfies particular requirements much more.

Figure 10:
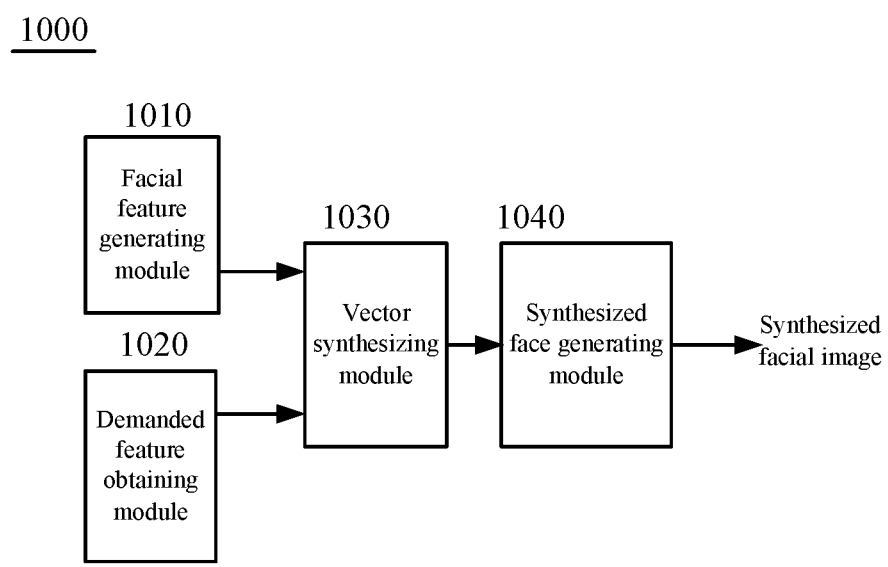
FIG. 10 is a schematic block diagram of a facial image generating apparatus according to an embodiment of the present disclosure.

FIG. 10 shows a schematic block diagram of a facial image generating apparatus according to an embodiment of the present disclosure.

A facial image generating apparatus 1000 according to an embodiment of the present disclosure comprises a facial feature generating module 1010, a demanded feature obtaining module 1020, a vector synthesizing module 1030, and a synthesized facial image generating module 1040.

The facial feature generating module 1010 is configured to generate an M-dimensional facial feature vector, M being an integer larger than one. According to an embodiment of the present disclosure, the facial feature vector may be extracted from a given facial image. For example, the deep convolutional network for facial feature extraction according to an embodiment of the present disclosure may be used to extract the facial feature vector from a given facial image. Alternatively, according to an embodiment of the present disclosure, the facial feature vector may be generated randomly, in this case, the facial feature vector represents a randomly generated face.

The demanded feature obtaining module 1020 is configured to obtain an N-dimensional demanded feature vector, N being an integer larger than or equal to one. For example, a value of each dimension of the N-dimensional demanded feature vector is a real number in a range of (−1,1) or a real number in a range of (0,1), and represents a different demand, for example, whether glasses were worn, whether there are bangs, light intensity, face rotation angle and so on.

The vector synthesizing module 1030 is configured to link the M-dimensional facial feature vector with the N-dimensional demanded feature vector to generate a synthesized feature vector. According to an embodiment of the present disclosure, the M-dimensional facial feature vector is linked with the N-dimensional demanded feature vector to generate an (M+N)-dimensional synthesized feature vector. For example, the N-dimensional demanded feature vector may be placed after the M-dimensional facial feature vector or before M-dimensional facial feature vector, or may be inserted into the M-dimensional facial feature vector.

The synthesized facial image generating module 1040 is configured to generate a synthesized facial image by use of a deep convolutional network for facial image generation and based on the synthesized feature vector. Structure of the deep convolutional network for facial image generation is as shown in FIGS. 3A and 3B, no more details are repeated here.

Figure 11A:
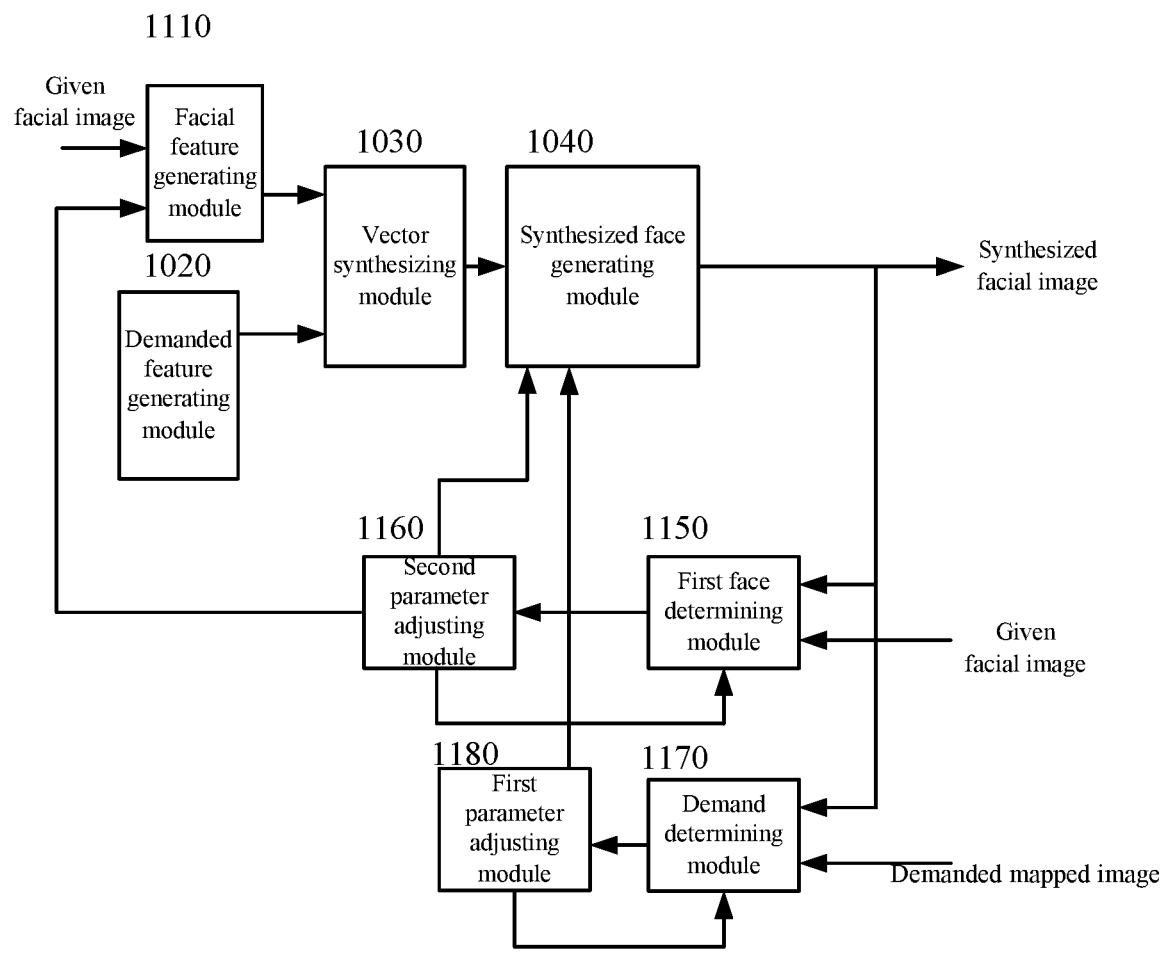
FIG. 11A is a schematic block diagram of a facial image generating and determining apparatus according to the first embodiment of the present disclosure.

FIG. 11A shows a schematic block diagram of a facial image generating and determining apparatus according to the first embodiment of the present disclosure.

The facial image generating and determining apparatus according to an embodiment of the present disclosure comprises a facial feature generating module 1110, a demanded feature obtaining module 1020, a vector synthesizing module 1030, a synthesized facial image generating module 1040, a first face determining module 1150, a second parameter adjusting module 1160, a demand determining module 1170, and a first parameter adjusting module 1180.

The facial feature generating module 1110 is configured to extract the facial feature vector from a given facial image and by use of a deep convolutional network for facial feature extraction. Structure of the deep convolutional network for facial feature extraction is as shown in FIG. 6, no details are repeated here.

The first face determining module 1150 is configured to generate a face matching score based on the synthesized facial image and the given facial image and by use of a first deep convolutional network for face determination, so as to determine whether the synthesized facial image and the given facial image belong to the same face. Structure of the deep convolutional network for face determination is as shown in FIGS. 7A and 8, no details are repeated here.

The demand determining module 1170 is configured to generate a demand satisfaction score based on the synthesized facial image and the demanded feature vector and by use of a deep convolutional network for demand determination, so as to determine whether the synthesized facial image satisfies requirements of the demanded feature vector. Structure of the deep convolutional network for demand determination is as shown in FIG. 9, no details are repeated here.

The second parameter adjusting module 1160 is configured to update parameters of the deep convolutional network for facial feature extraction, the deep convolutional network for facial image generation, and the first deep convolutional network for face determination based on the face matching score. According to an embodiment of the present disclosure, the second parameter adjusting module 1160 may use a gradient descent method or the like to update parameters of the respective networks.

The first parameter adjusting module 1180 is configured to update parameters of the deep convolutional network for facial image generation and the deep convolutional network for demand determination based on the demand satisfaction score. According to an embodiment of the present disclosure, the first parameter adjusting module 1180 may use a gradient descent method or the like to update parameters of the respective networks.

Figure 11B:
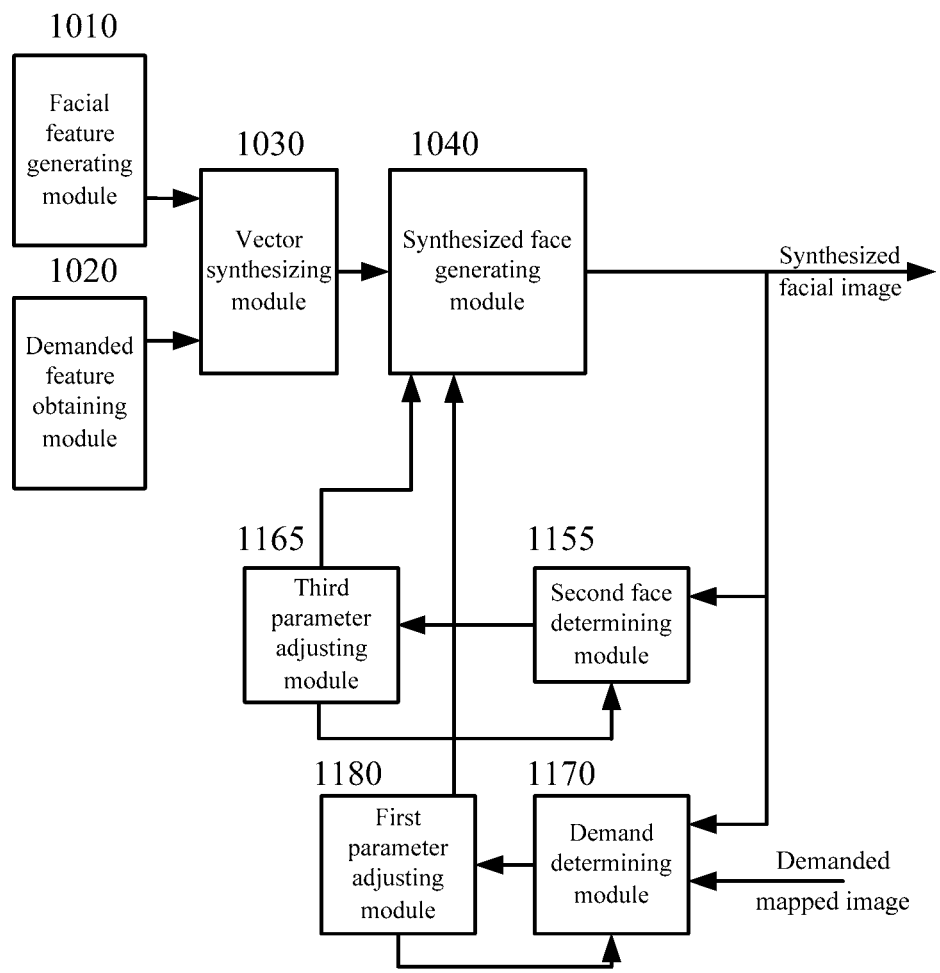
FIG. 11B is a schematic block diagram of a facial image generating and determining apparatus according to the second embodiment of the present disclosure.

FIG. 11B shows a schematic block diagram of a facial image generating and determining apparatus according to the second embodiment of the present disclosure.

The facial image generating and determining apparatus according to an embodiment of the present disclosure comprises a facial feature generating module 1115, a demanded feature obtaining module 1020, a vector synthesizing module 1030, a synthesized facial image generating module 1040, a second face determining module 1155, a third parameter adjusting module 1165, a demand determining module 1170, and a first parameter adjusting module 1180.

The facial feature generating module 1115 is configured to randomly generate the facial feature vector.

The second face determining module 1155 is configured to generate a face satisfaction score based on the synthesized facial image and by use of a second deep convolutional network for face determination, so as to determine whether the synthesized facial image is a facial image. Structure of the deep convolutional network for face determination is as shown in FIGS. 7A and 8, no details are repeated here.

The demand determining module 1170 is configured to generate a demand satisfaction score based on the synthesized facial image and the demanded mapped images generated from the demanded feature vector and by use of a deep convolutional network for demand determination, so as to determine whether the synthesized facial image satisfies requirements of the demanded feature vector. Structure of the deep convolutional network for demand determination is as shown in FIG. 9, no details are repeated here.

The third parameter adjusting module 1165 is configured to update parameters of the deep convolutional network for facial image generation and the second deep convolutional network for face determination based on the face satisfaction score. According to an embodiment of the present disclosure, the third parameter adjusting module 1165 may use a gradient descent method or the like to update parameters of the respective networks.

The first parameter adjusting module 1180 is configured to update parameters of the deep convolutional network for facial image generation and the deep convolutional network for demand determination based on the demand satisfaction score. According to an embodiment of the present disclosure, the first parameter adjusting module 1180 may use a gradient descent method or the like to update parameters of the respective networks.

Figure 12:
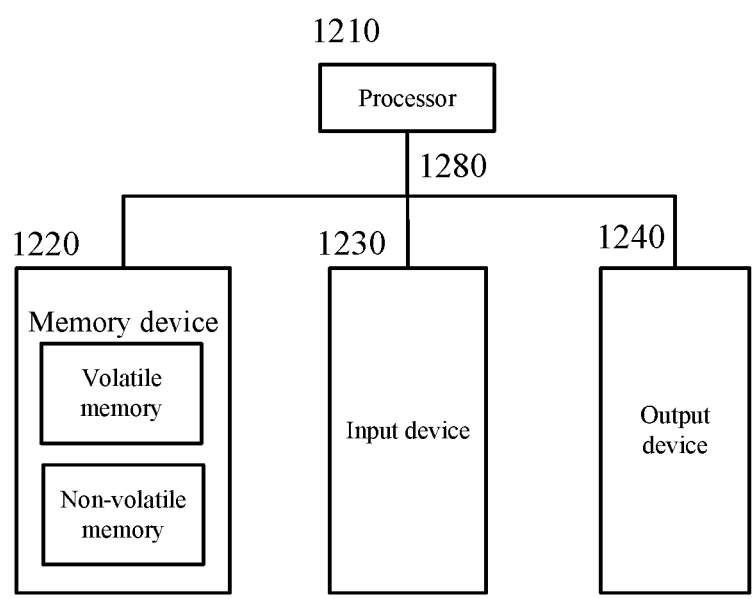
FIG. 12 is a schematic block diagram of an electronic device in which a facial image generating and determining apparatus according to an embodiment of the present disclosure is implemented.

FIG. 12 shows a schematic block diagram of structure of an electronic device in which a facial image generating and determining apparatus according to an embodiment of the present disclosure is implemented.

The electronic device comprises one or more processors 1210, a memory device 1220, an input device 1230, and an output device 1240, these components are interconnected via a bus system 1280 and/or other forms of connection mechanism (not shown). It should be noted that the components and structure of the electronic device shown in FIG. 12 are merely exemplary, rather than restrictive, the electronic device may also have other components and structures as desired.

The processor 1210 may be a central processing unit (CPU) or other forms of processing unit having data processing capability and/or instruction executing capability.

The storage device 1220 may include one or more computer program products, the computer program product may include various forms of computer readable storage medium, such as volatile memory and/or non-volatile memory. The volatile memory may include, for example, random access memory (RAM) and/or cache. The non-volatile memory may include, for example, read only memory (ROM), hard disk, flash memory. One or more computer program instructions may be stored on the computer-readable storage medium, and the processor 1210 can run the program instructions to implement the functions described above in the embodiments of the present disclosure (implemented by the processor) and/or other intended functions. Various applications and data, such as the given face image, the synthesized facial image, the demanded feature vector etc., as well as various data used and/or generated by the applications, may also be stored in the computer-readable storage medium.

The input device 1230 may include a device for inputting the given facial image or the demanded feature vector, such as a keyboard.

The output device 1240 may include a display to output the synthesized facial image and/or various score results, and may also include a speaker or the like to output various score results.

The computer program instructions stored in the storage device 1220 can be executed by the processor 1210 to implement the facial image generating method and apparatus as described above, and the face image generating and determining method and apparatus as described above, and the deep convolutional network for facial feature extraction, the deep convolutional network for facial image generation, the deep convolutional network for face determination, and the deep convolutional network for demand determination in particular as described above.

As will be appreciated, according to an embodiment of the present disclosure, a facial image is generated by use of a deep convolutional network for facial image generation and based on a facial feature vector and a demanded feature vector, so a facial image with a specific feature prescribed by the demanded feature vector can be generated fast without using the three-dimensional model.

In addition, according to an embodiment of the present disclosure, after a synthesized facial image is generated, whether the generated synthesized facial image satisfies requirements of the demanded feature vector is determined and the corresponding demand satisfaction score is generated by use of the deep convolutional network for demand determination, and further, parameters of the deep convolutional network for facial image generation and the deep convolutional network for demand determination are updated based on the demand satisfaction score, thereby the deep convolutional network for facial image generation and the deep convolutional network for demand determination can be trained in synchronization.

In addition, according to an embodiment of the present disclosure, after a synthesized facial image is generated, whether the generated synthesized facial image is a facial image or whether the generated synthesized facial image and the given facial image belong to the same face is determined and the corresponding face satisfaction score or face matching score is generated by use of the deep convolutional network for face determination, and further, parameters of the deep convolutional network for facial image generation and the deep convolutional network for face determination are updated based on the generated face satisfaction score or the generated face matching score, thereby the deep convolutional network for facial image generation and the deep convolutional network for face determination can be trained in synchronization.

Although the exemplary embodiments of the present disclosure have been described with reference to the drawings, as will be appreciated, the above exemplary embodiments are only illustrative, not intended to limit the protection scope of the present disclosure. Those of ordinary skill in the art may make many changes, modifications, thereto without departing from the principle and spirit of the present disclosure, and all of these changes, modifications should fall into the protection scope of the present disclosure.

What is claimed is:

1. A facial image generating method, comprising:
generating an M-dimensional facial feature vector, M being an integer larger than one;
linking the M-dimensional facial feature vector with an N-dimensional demanded feature vector to generate an (M+N)-dimensional synthesized feature vector, N being an integer larger than or equal to one; and
generating a synthesized facial image by use of a deep convolutional network for facial image generation and based on the synthesized feature vector,
wherein generating the facial feature vector comprises:
extracting the facial feature vector from a given facial image by use of a deep convolutional network for facial feature extraction; or
randomly generating the facial feature vector, wherein the deep convolutional network for facial feature extraction comprises:
P layers of convolutional neural network and at least one layer of fully connected neural network, P being an integer larger than or equal to two,
wherein a first layer of convolutional neural network is used to receive the given facial image, the at least one layer of fully connected neural network is used to receive images outputted from a P-th layer of convolutional neural network and generate the facial feature vector.

2. The facial image generating method according to claim 1, wherein the deep convolutional network for facial image generation comprises at least one layer of fully connected neural network and K layers of integrated convolutional neural network, each layer of integrated convolutional neural network comprising an amplification network and J layers of convolutional neural network, K being an integer larger than or equal to two, and J being an integer larger than or equal to two.

3. The facial image generating method according to claim 2, wherein generating the synthesized facial image by use of the deep convolutional network for facial image generation and based on the synthesized feature vector comprises:
generating initial synthesized images by use of the at least one layer of fully connected neural network and based on the synthesized feature vector;
receiving the initial synthesized images and generating synthesized images of a first layer by use of the first layer of integrated convolutional neural network, a number of the synthesized images of the first layer being smaller than a number of the initial synthesized images; and
receiving synthesized images outputted from a (k−1)-th layer of integrated convolutional neural network and generating synthesized images of a k-th layer by use of the k-th layer of integrated convolutional neural network, k being an integer larger than or equal to two and smaller than or equal to K, a size of the synthesized images of the k-th layer being larger than a size of the synthesized images of the (k−1)-th layer, and a number of the synthesized images of the k-th layer being smaller than a number of the synthesized images of the (k−1)-th layer,
wherein synthesized images of a K-th layer as outputted from the K-th layer of integrated convolutional neural network is taken as the synthesized facial image.

4. The facial image generating method according to claim 2, wherein generating the synthesized facial image by use of the deep convolutional network for facial image generation and based on the synthesized feature vector comprises:
generating initial synthesized images by use of the at least one layer of fully connected neural network and based on the synthesized feature vector;
receiving the initial synthesized images and N initial mapped images generated as mapping from the N-dimensional demanded feature vector and generating synthesized images of a first layer by use of the first layer of integrated convolutional neural network, a size of the initial synthesized images being the same as a size of the initial mapped images, a number of the synthesized images of the first layer being smaller than a number of the initial synthesized images; and
receiving synthesized images outputted from a (k−1)-th layer of integrated convolutional neural network and N mapped images of the (k−1)-th layer generated as mapping from the N-dimensional demanded feature vector and generating synthesized images of a k-th layer by use of the k-th layer of integrated convolutional neural network, a size of the synthesized images of the (k−1)-th layer being the same as a size of the mapped images of the (k−1)-th layer, a size of the synthesized images of the k-th layer being larger than a size of the synthesized images of the (k−1)-th layer, and a number of the synthesized images of the k-th layer being smaller than a number of the synthesized images of the (k−1)-th layer,
wherein each dimension of the N-dimensional demanded feature vector is mapped as one of the N initial mapped images and also mapped as one of N mapped images of the (k−1)-th layer, k being an integer larger than or equal to two and smaller than or equal to K,
wherein synthesized images of a K-th layer as outputted from the K-th layer of integrated convolutional neural network is taken as the synthesized facial image.

5. The facial image generating method according to claim 1, further comprising:
generating a demand satisfaction score based on the synthesized facial image and the demanded feature vector and by use of a deep convolutional network for demand determination; and
updating parameters of the deep convolutional network for facial image generation and the deep convolutional network for demand determination based on the demand satisfaction score.

6. The facial image generating method according to claim 5, wherein in the case of extracting the facial feature vector from a given facial image, the facial image generating method further comprises:
generating a face matching score based on the synthesized facial image and the given facial image and by use of a first deep convolutional network for face determination; and
updating parameters of the deep convolutional network for facial feature extraction, the deep convolutional network for facial image generation, and the first deep convolutional network for face determination based on the face matching score.

7. The facial image generating method according to claim 5, wherein in the case of randomly generating the facial feature vector, the facial image generating method further comprises:
generating a face satisfaction score based on the synthesized facial image and by use of a second deep convolutional network for face determination; and
updating parameters of the deep convolutional network for facial image generation and the second deep convolutional network for face determination based on the face satisfaction score.

8. The facial image generating method according to claim 6, wherein the first deep convolutional network for face determination comprises a first to-be-determined feature vector extraction network, a second to-be-determined feature vector extraction network, and a fully connected neural network,
wherein the first to-be-determined feature vector extraction network is used to extract a first to-be-determined feature vector from the given facial image;
the second to-be-determined feature vector extraction network is used to extract a second to-be-determined feature vector from the synthesized facial image;

the fully connected neural network is used to generate the face matching score based on the first to-be-determined feature vector and the second to-be-determined feature vector,
wherein parameters of the first to-be-determined feature vector extraction network are the same as parameters of the second to-be-determined feature vector extraction network, a dimension number of the first to-be-determined feature vector is the same as a dimension number of the second to-be-determined feature vector, but larger than a dimensional number of the facial feature vector.

9. The facial image generating method according to claim 7, wherein the second deep convolutional network for face determination comprises a third to-be-determined feature vector extraction network and a fully connected neural network,
the third to-be-determined feature vector extraction network is used to extract a third to-be-determined feature vector from the synthesized facial image,
the fully connected neural network is used to generate the face satisfaction score based on the third to-be-determined feature vector,
wherein a dimension number of the third to-be-determined feature vector is larger than a dimension number of the facial feature vector.

10. The facial image generating method according to claim 8, wherein each of the to-be-determined feature vector extraction networks comprises at least one layer of convolutional neural network, at least one layer of locally connected convolutional neural network, and at least one layer of fully connected neural network,
wherein a first layer of convolutional neural network is used to receive an input image of the to-be-determined feature vector extraction network, the at least one layer of convolutional neural network is cascaded, and a last layer of convolutional neural network is connected to a first layer of locally connected convolutional neural network, the at least one layer of locally connected convolutional neural network is cascaded, a last layer of locally connected convolutional neural network is connected to a first layer of fully connected neural network, the at least one fully connected neural network is cascaded, and a last layer of fully connected neural network outputs a to-be-determined feature vector of the to-be-determined feature vector extraction network.

11. A facial image generating apparatus, comprising:
a facial feature generating module configured to:
generate an M-dimensional facial feature vector, M being an integer larger than one, and
extract the facial feature vector from a given facial image by use of a deep convolutional network for facial feature extraction,
wherein the deep convolutional network for facial feature extraction comprises:
P layers of convolutional neural network and at least one layer of fully connected neural network, P being an integer larger than or equal to two,
wherein a first layer of convolutional neural network is used to receive the given facial image, the at least one layer of fully connected neural network is used to receive images outputted from a P-th layer of convolutional neural network and generate the facial feature vector;
a vector synthesizing module configured to link the M-dimensional facial feature vector with an N-dimensional demanded feature vector to generate an (M+N)-dimensional synthesized feature vector, N being an integer larger than or equal to one; and
a synthesized facial image generating module configured to generate a synthesized facial image by use of a deep convolutional network for facial image generation and based on the synthesized feature vector.

12. A facial image generating device, comprising:
one or more processors;
one or more memories for storing program instructions, the program instructions being executed by the processors to perform the following steps:
generating an M-dimensional facial feature vector, M being an integer larger than one;
linking the M-dimensional facial feature vector with an N-dimensional demanded feature vector to generate an (M+N)-dimensional synthesized feature vector, N being an integer larger than or equal to one; and
generating a synthesized facial image by use of a deep convolutional network for facial image generation and based on the synthesized feature vector,
wherein generating the facial feature vector comprises:
extracting the facial feature vector from a given facial image by use of a deep convolutional network for facial feature extraction; or
randomly generating the facial feature vector,
wherein in the case of extracting the facial feature vector from the given facial image, the processors execute the program instructions further for:
generating a face matching score based on the synthesized facial image and the given facial image and by use of a first deep convolutional network for face determination; and
updating parameters of the deep convolutional network for facial feature extraction, the deep convolutional network for facial image generation, and the first deep convolutional network for face determination based on the face matching score; or
in the case of randomly generating the facial feature vector, the processors execute the program instructions further for:
generating a face satisfaction score based on the synthesized facial image and by use of a second deep convolutional network for face determination; and
updating parameters of the deep convolutional network for facial image generation and the second deep convolutional network for face determination based on the face satisfaction score.

13. The facial image generating device according to claim 12, wherein the deep convolutional network for facial image generation comprises at least one layer of fully connected neural network and K layers of integrated convolutional neural network, each layer of integrated convolutional neural network comprising an amplification network and J layers of convolutional neural network, K being an integer larger than or equal to two, and J being an integer larger than or equal to two.

14. The facial image generating device according to claim 13, wherein generating the synthesized facial image by use of the deep convolutional network for facial image generation and based on the synthesized feature vector comprises:
generating initial synthesized images by use of the at least one layer of fully connected neural network and based on the synthesized feature vector;

receiving the initial synthesized images and generating synthesized images of a first layer by use of the first layer of integrated convolutional neural network, a number of the synthesized images of the first layer being smaller than a number of the initial synthesized images; and receiving synthesized images outputted from a (k−1)-th layer of integrated convolutional neural network and generating synthesized images of a k-th layer by use of the k-th layer of integrated convolutional neural network, k being an integer larger than or equal to two and smaller than or equal to K, a size of the synthesized images of the k-th layer being larger than a size of the synthesized images of the (k−1)-th layer, and a number of the synthesized images of the k-th layer being smaller than a number of the synthesized images of the (k−1)-th layer, wherein synthesized images of a K-th layer as outputted from the K-th layer of integrated convolutional neural network is taken as the synthesized facial image.

15. The facial image generating device according to claim 13, wherein generating a synthesized facial image by use of a deep convolutional network for facial image generation and based on the synthesized feature vector comprises:

generating an initial synthesized images by use of the at least one layer of fully connected neural network and based on the synthesized feature vector;

receiving the initial synthesized images and N initial mapped images generated as mapping from the N-dimensional demanded feature vector and generating synthesized images of a first layer by use of the first layer of integrated convolutional neural network, a size of the initial synthesized images being the same as a size of the initial mapped images, a number of the synthesized images of the first layer being smaller than a number of the initial synthesized images; and receiving synthesized images outputted from a (k−1)-th layer of integrated convolutional neural network and N mapped images of the (k−1)-th layer generated as mapping from the N-dimensional demanded feature vector and generating synthesized images of a k-th layer by use of the k-th layer of integrated convolutional neural network, a size of the synthesized images of the (k−1)-th layer being the same as a size of the mapped images of the (k−1)-th layer, a size of the synthesized images of the k-th layer being larger than a size of the synthesized images of the (k−1)-th layer, and a number of the synthesized images of the k-th layer being smaller than a number of the synthesized images of the (k−1)-th layer, wherein each dimension of the N-dimensional demanded feature vector is mapped as one of the N initial mapped images and also mapped as one of N mapped images of the (k−1)-th layer, k being an integer larger than or equal to 2 and smaller than or equal to K, wherein synthesized images of a K-th layer as outputted from the K-th layer of integrated convolutional neural network is taken as the synthesized facial image.

16. The facial image generating device according to claim 12, wherein the processors execute the program instructions further for:

generating a demand satisfaction score based on the synthesized facial image and the demanded feature vector and by use of a deep convolutional network for demand determination; and updating parameters of the deep convolutional network for facial image generation and the deep convolutional network for demand determination based on the demand satisfaction score.

* * * * *